United States Patent [19]

Carney

[11] 3,723,679

[45] Mar. 27, 1973

[54] SWITCHING APPARATUS

[75] Inventor: William V. Carney, Valley Stream, N.Y.

[73] Assignee: Porta Systems Corp., Roslyn, N.Y.

[22] Filed: Feb. 28, 1972

[21] Appl. No.: 229,821

[52] U.S. Cl. ................................200/50 B, 200/51 R
[51] Int. Cl. ..........................H01h 9/20, H01h 33/46
[58] Field of Search..200/51 R, 50 B; 179/169, 1 PC, 179/175.1

[56] References Cited

UNITED STATES PATENTS 2,934,623 4/1960 Christensen..........................337/75

*Primary Examiner*—David Smith, Jr.
*Attorney*—Philip D. Amins

[57] ABSTRACT

A rotary switch arrangement for selectively connecting a desired one of a number of input terminals to a dual phone jack. A mechanical linkage arrangement is provided to prevent rotation of the switch when a dual phone plug is inserted into the jack. This arrangement eliminates line transients caused by rotation of the switch while currents are flowing through the phone jack.

17 Claims, 6 Drawing Figures

SWITCHING APPARATUS

BACKGROUND OF THE INVENTION

This invention relates to switching apparatus, and is especially useful for, although not limited to, selectively connecting a number of telephone central office talk line and test line circuits to a common group of terminals.

At present, the various frames employed in telephone central office equipment include a plurality of individual talk line and test line jack installations, to which phone plugs attached to suitable headphones or other equipment may be connected to provide intra-office communication and test functions. Since an individual phone jack (or pair of phone jacks for four-wire systems) is provided for each circuit, the talk line and test line installations occupy a substantial amount of mounting space on the equipment frames, and are relatively inefficient. The inefficiency results from that fact that an excessive amount of time is required to change phone plugs from one circuit to another, and to locate the desired circuit or circuits on the equipment frame or frames.

One way to increase the efficiency of utilization of such talk line and test line circuits is to arrange the circuits in clusters, typically of 24 circuits per cluster, and to provide a single phone jack or jacks for each cluster, with a rotary switch arrangement for connecting the jack or jacks to a desired one of the cluster circuits. Such an arrangement is disclosed, for example, in copending U.S. Pat. application Ser. No. 188,722 entitled "Talk Line Multiple Communication and Test Apparatus", and assigned to the assignee of the present application.

However, it has been discovered that when such a switching arrangement is employed, undesirable transients and noise are introduced into the other circuits of the cluster when the rotary switch is rotated while a phone plug to which the test or talk line apparatus is connected, is in mated relationship with the jack to which the selector switch is connected. These transients are caused by currents flowing through the mated phone plug and jack, and are not introduced if the switch is rotated with the jack open circuited, i.e. not in mating engagement with a corresponding plug.

SUMMARY OF THE INVENTION

As herein described, there is provided, in combination, a switch having a plurality of selectable terminals and at least one common terminal, and a first connector member adapted to receive a second connector member in mating relationship therewith. The switch includes a movable element for selectively electrically connecting desired ones of the selectable terminals to the common terminal. There is provided means for restraining movement of the movable element only when the connector members are engaged in mating relationship.

BRIEF DESCRIPTION OF THE DRAWINGS

The foregoing and other objects, features and advantages of the invention will become more apparent from the following detailed description considered in conjunction with the accompanying drawings, wherein.

DETAILED DESCRIPTION OF THE PREFERRED EMBODIMENTS

Figures 1, 2:
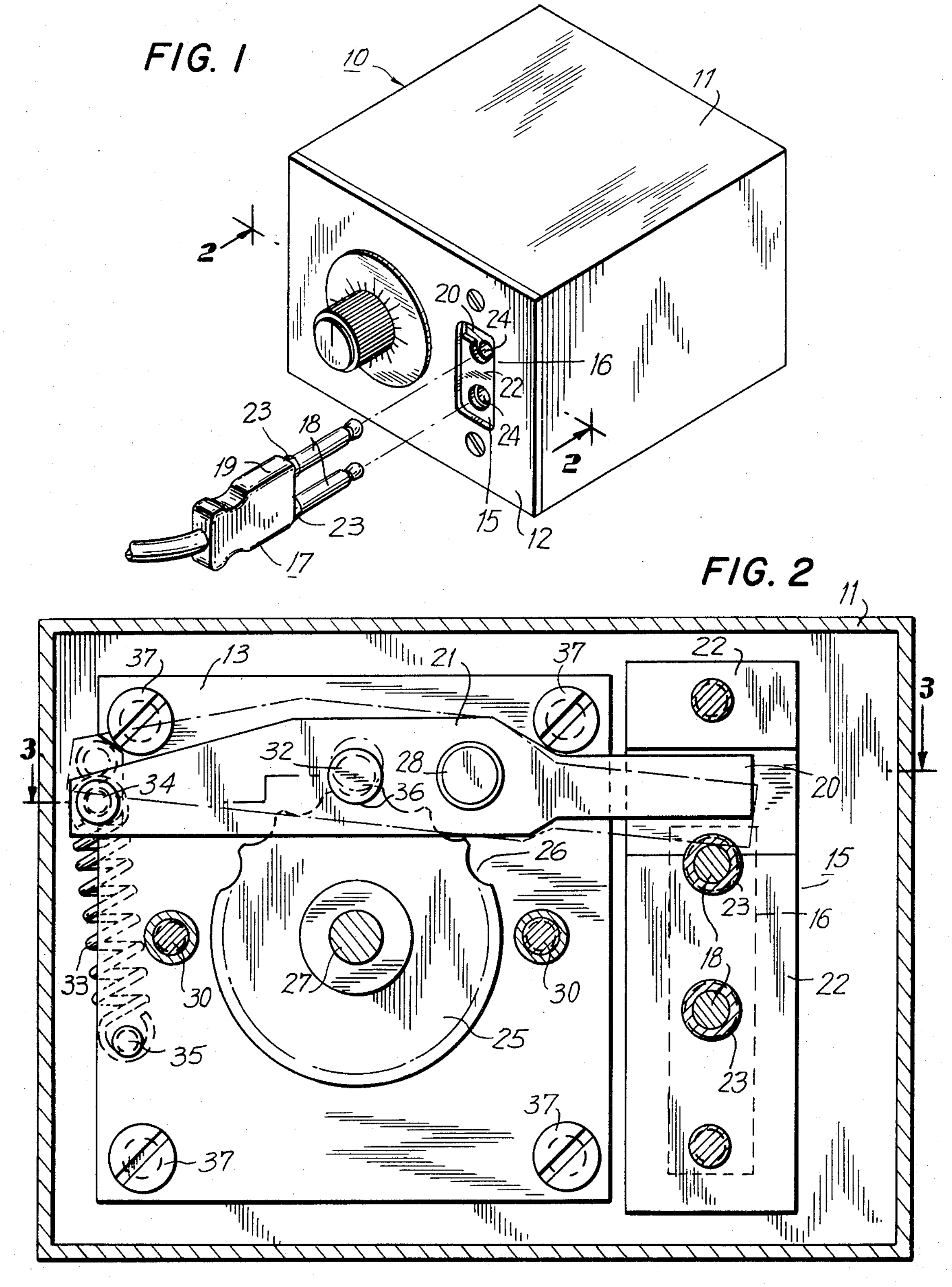
FIG. 1 depicts a housing having a front panel to which is secured a rotary selector switch and a dual phone jack pursuant to a first embodiment of the present invention.
FIG. 2 is a cross-sectional view taken on the line 2—2 of FIG. 1.

The switching unit 10 shown in FIG. 1 includes a housing 11 having a front panel 12 to which is secured a 4-pole, 24-position switch 13 having a rotatable selector knob 14.

Also secured to the front panel 12 of the housing 11 is a dual phone jack 15. Access to the dual jack 15 is provided by a cutout 16 in the front panel 12, so that a mating dual phone plug 17 having contact portions in the form of pins 18 and a body portion 19 may be inserted through the cutout 16 to mate with the conductors of the dual jack 15.

As will be hereinafter described, when the knob 14 of the switch 13 is rotated, the actuating portion 20 of a lever 21 is caused to oscillate in and out of the area immediately behind the front panel 12 defined by the cutout 16. The upper portion of the insulating spacer 22 of the dual jack 15 is removed to allow clearance for oscillation of the actuating portion 20 of the lever 15.

As will also hereinafter be described, the lever 21 is arranged so that when the knob 14 of the switch 13 is in a position corresponding to a selected circuit, the lever actuating portion 20 (FIG. 2) does not penetrate into the area immediately behind the cutout 16 in the front panel 12. However, any movement of the knob 14 from the selected position causes the actuating portion 20 of the lever 21 to move downwardly, as indicated by the dashed lines shown in FIG. 2, to penetrate into the area behind the cutout 16. The pins 18 of the dual phone plug 17 have enlarged shoulder portions 23 adjacent the plug body 19. The insulator 22 of the dual jack 15 has enlarged holes 24 therein for receiving the pins 18 and the shoulders 23 of the dual plug 17 when the plug 17 is inserted through the cutout 16 of the front panel 12 to mate with the dual jack 15. With the phone connectors 15 and 17 so mated, the shoulder 23 of the dual phone plug 17 abuts against the adjacent part of the actuating portion 20 of the lever 21, so as to prevent oscillation of the lever 21 when the connectors 17 and 15 are in mated relationship with one another.

The manner in which the upper shoulder 23 of the dual plug 17 operates to restrain rotation of the knob 14 of the switch 13 when the phone connectors are mated will be more clearly understood from a further consideration of FIG. 2. A wheel 25 having peripheral undulations 26 thereon is concentrically mounted for rotation on the shaft 27 of the rotary switch 13. The switch knob 14 (FIG. 1) is mounted on the end portion of the shaft 27 which extends through a hole in the front panel 12 of the housing 11.

The lever 21 is pivotally mounted on a pivot pin 28 which is secured to the front supporting plate 29 (FIG. 3) of the switch 13 and the supporting plate 29 is secured to the front panel 12 of the housing 11 by means of threaded bolts 30 and spacers 31.

A pin 32 is affixed to the lever 21 and is positioned adjacent the periphery of the wheel 25 and urged against the undulations 26 of the wheel 25 by the biasing action of a spring 33. The spring extends between a pin 34 affixed to one end of the lever 21 and a pin 35 affixed to the switch front support plate 29.

The undulations 26 at the periphery of the wheel 25 are arranged to be coincident with the various operating positions of the switch 13, so that the cam-like action of the pin 32 in conjunction with the undulations 26 of the wheel 25 causes the actuating portion 20 of the lever 21 to oscillate up and down each time the switch 13 is rotated from one operating position to another.

When the dual phone plug 17 is in mating engagement with the dual phone jack 15, the upper shoulder 23 of the plug 17 prevents full downward movement of the actuating portion 20 of the lever 21, thus preventing pin 32 from riding out of the adjacent groove or undulation 36 and preventing rotation of the switch 13.

Thus, it is seen that when the phone plug 17 is in mating relationship with the phone jack 15, rotation of the knob 14 of the switch 13 is restrained. This restraining action prevents the introduction of undesirable transients and noise into the various circuits to which the switch 13 is connected.

The front supporting plate 29 of the connector 13 is secured to the electrical switching portion (not shown) of the switch 13 by threaded screws 37 and spacers 40.

Figure 3:
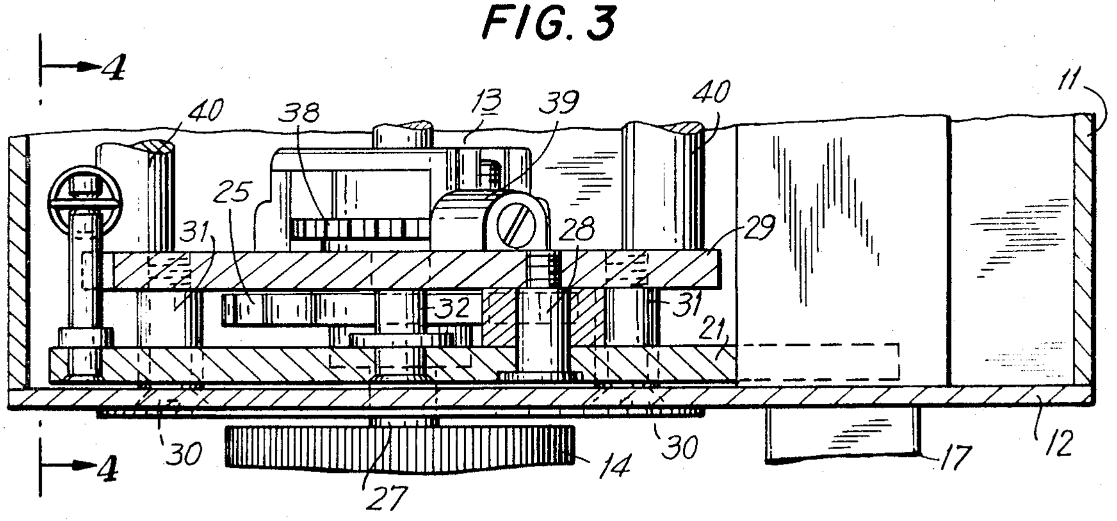
FIG. 3 illustrates a cross-sectional plan view of the forward portion of the unit taken on the line 3—3 of FIg. 2.

In the structure shown in FIGS. 2 and 3, the biasing spring 33 is relatively weak in order to minimize the additional force required to rotate the switch knob 14. Thus, proper detent action to retain the switch 13 in each of its 24 operating positions is provided by a detent wheel 38 in conjunction with an adjacent detent member 39 in the form of a steel ball which is urged against the peripheral grooves of the detent wheel 38 by a suitable spring. The detailed structure of the detent member 39 is well known in the art, and is not shown in the drawing.

Figures 4, 5, 6:
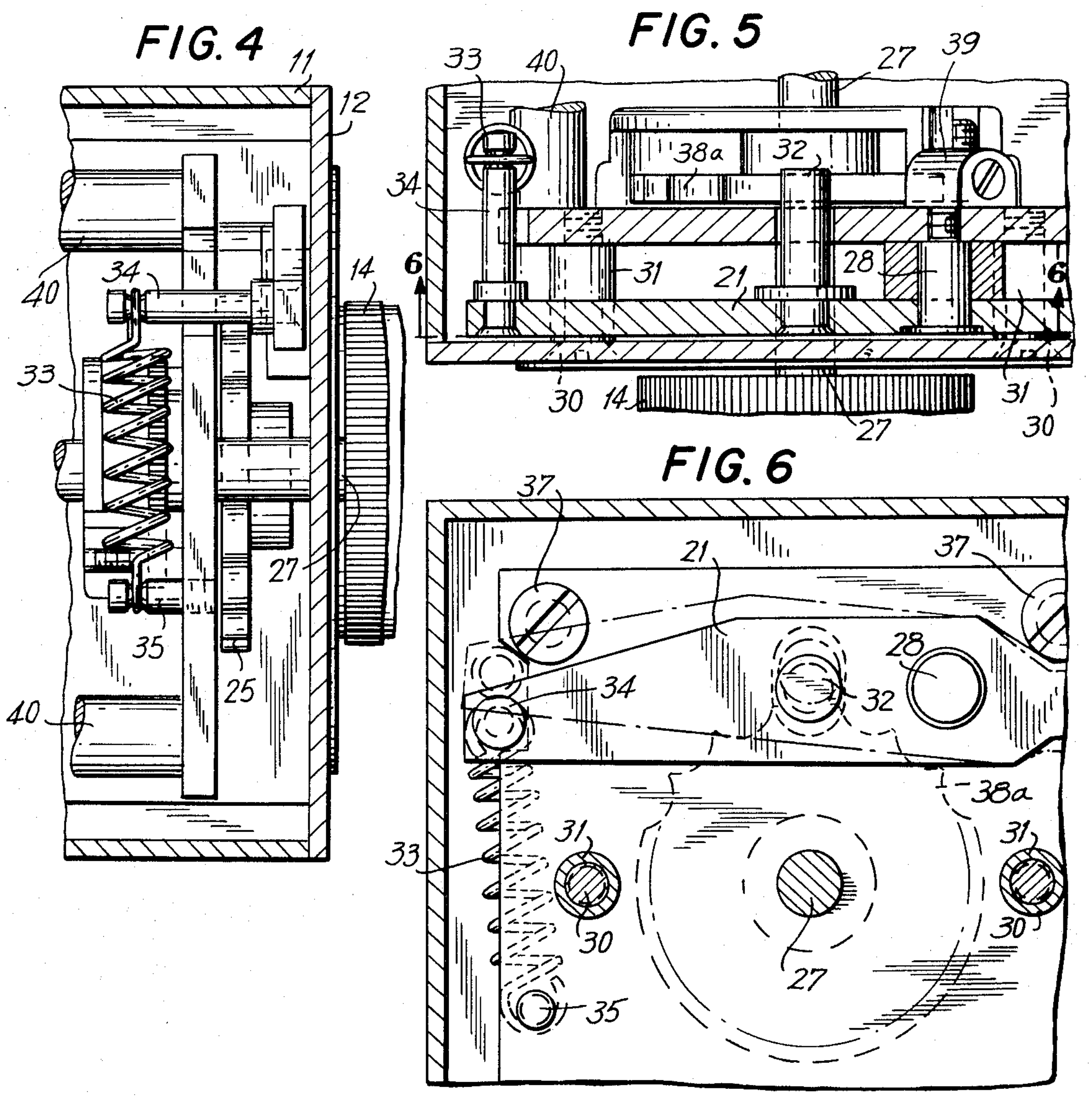
FIG. 4 is a side cross-sectional view of the forward portion of the unit shown in FIG. 1, taken on the line 4—4 of FIG. 3.
FIG. 5 shows a cross-sectional plan view of the forward portion of the unit shown in FIG. 1, constructed in accordance with a second embodiment of the invention.
FIG. 6 depicts a cross-sectional elevation view of the embodiment shown in FIG. 5 taken on the line 6—6 thereof.

A somewhat simpler structure may be realized by eliminating the wheel 25 and utilizing the detent wheel 38 or a similar wheel to engage the pin 32 of the lever 21 to provide the desired oscillation of the actuating portion of the lever 21. Such an alternative arrangement is shown in FIGS. 5 and 6, wherein the detent wheel 38 and the wheel 25 have been replaced by a single wheel **38*a*. The periphery of wheel 38*a* is engaged at one point by the pin 32 of the lever 21 and at another point angularly spaced therefrom by the detent member 39. The remaining portions of the structure shown in FIGS. 5 and 6** are similar to corresponding portions of the structure shown in the other figures of the drawing and are identified by the same reference numerals.

Although the unit 10 is not normally provided with internal wiring connections between the dual jack 15 and the switch 13, it is intended that the common terminal or terminals of the switch 13 to which the 24 circuits associated with the switch 13 may be selectively connected be electrically connected to a corresponding terminal or terminals of the jack 15. In this manner, the apparatus connected to any desired circuit associated with the switch 13. As described above, the unit 10 is so designed that it is not possible to rotate the selector knob 14 of the switch 13 after the plug 17 has been engaged with the jack 15, thus preventing the introduction of undesirable transients and noise into the system to which the unit 10 is electrically connected.

If desired, the detent member 39 may be dispensed with in the arrangement shown in FIGS. 5 and 6, provided that the spring 33 is made sufficiently strong to provide positive detent action.

While I have shown and described the preferred embodiments of my invention, it will be apparent to those skilled in the art that there are various modifications, changes and improvements which may be made therein without departing from the spirit and scope of the invention.

What is claimed is:

1. A switching apparatus comprising,
a switch having a plurality of selectable terminals and at least one common terminal,
said switch including a rotor for selectively electrically connecting desired ones of said selectable terminals to said common terminal,
a first connector member adapted to receive a second connector member in mating relationship therewith,
means for restraining movement of said rotor when said connector members are engaged in mating relationship, and
detent means for biasing said rotor in a plurality of angular positions corresponding to the connection of respective ones of said selectable terminals to said common terminal.

2. A switching apparatus according to claim 1, wherein
said restraining means includes said detent means.

3. A switching apparatus according to claim 1, wherein
said restraining means comprises a lever,
means for causing said lever to oscillate when the angular position of said rotor is changed, and
said lever having an actuating portion for contacting a portion of said connector member to limit movement of said lever when said connectors are engaged, thereby preventing said lever from oscillating and restraining rotation of said rotor.

4. A switching apparatus according to claim 3, wherein
said restraining means includes a wheel mounted for rotation in synchronism with said rotor,
said wheel having a plurality of peripheral undulations therein at angular positions corresponding to the angular positions of said rotor as established by said detent means,
a pin affixed to said lever and positioned adjacent the periphery of said wheel, and
resilient biasing means for urging said pin against the periphery of said wheel, whereby said lever oscillates in accordance with said undulations when said rotor is rotated.

5. A switching apparatus according to claim 4, wherein said detent means comprises a detent member adjacent the periphery of said wheel and angularly spaced from said pin, and second resilient biasing means for urging said detent member against the periphery of said wheel.

6. A rotary switching apparatus comprising a rotary switch having a plurality of angularly spaced operating positions, detent means for biasing said switch in each of said operating positions, a wheel having a plurality of peripheral undulations therein corresponding to the number of operating positions and being mounted for rotation with said switch, pivotally mounted lever means having a first portion adjacent the periphery of said wheel and an actuating portion, biasing means for urging said first portion against the periphery of said wheel, whereby said actuating portion oscillates in response to pivoting of said lever means as said first portion follows said undulations when said wheel rotates due to rotation of said switch, an electrical connector adjacent said actuating portion and adapted to receive a mating connector, and each connector having a contact part and a body part, whereby when said connectors are engaged, a part of said mating connector abuts said actuating portion to prevent oscillation thereof and thereby prevents rotation of said switch.

7. A rotary switching apparatus according to claim 6, wherein said switch has a plurality of selectable terminals and at least one common terminal, and means for electrically connecting said common terminal to the contact part of said electrical connector.

8. A rotary switching apparatus according to claim 6, wherein said switch and said electrical connector are secured to a common panel.

9. A rotary switching apparatus according to claim 6, wherein said electrical connector is a phone jack and said mating connector is a phone plug.

10. A rotary switching apparatus according to claim 9, wherein said switch and said electrical connector are secured to a common panel.

11. A rotary switching apparatus according to claim 8, wherein said lever means is situated adjacent said panel whereby said actuating portion oscillates parallel to said panel when said switch is rotated and said actuating portion periodically extending between said electrical connector and said panel when said switch is rotated.

12. A rotary switching apparatus according to claim 11, wherein said electrical connector is a phone jack and said mating connector is a phone plug.

13. A rotary switching apparatus according to claim 6, wherein said detent means comprises a detent member adjacent said wheel and angularly spaced from said first portion, and resilient biasing means for urging said detent member against the undulations of said wheel periphery.

14. A rotary switching apparatus according to claim 13, wherein said switch has a plurality of selectable terminals and at least one common terminal, and means for electrically connecting said common terminal to the contact part of said electrical connector.

15. A rotary switching apparatus according to claim 14, wherein said switch and said electrical connector are secured to a common panel.

16. A rotary switching apparatus according to claim 15, wherein said electrical connector is a phone jack and said mating connector is a phone plug.

17. A rotary switching apparatus according to claim 16, wherein said lever means is situated adjacent said panel whereby said actuating portion oscillates parallel to said panel when said switch is rotated, and said actuating portion periodically extending between said electrical connector and said panel when said switch is rotated.

* * * * *